Patented Mar. 4, 1941

2,233,656

UNITED STATES PATENT OFFICE 2,233,656

LACTATE OF A NITRO ALCOHOL

Byron M. Vanderbilt, Cranford, N. J., assignor to Purdue Research Foundation, La Fayette, Ind., a corporation of Indiana No Drawing. Application May 1, 1940, Serial No. 332,691

1 Claim. (Cl. 260—484)

My invention relates to the reaction product resulting from the action of lactic acid on 2-propyl-2-nitro-1,3-propanediol.

This esterification product may be prepared in accordance with any convenient procedure. However, I prefer to obtain the same by reacting 2-propyl-2-nitro-1,3-propanediol with a molecular excess of lactic acid, which is preferably employed in the form of a strong aqueous solution. The mixture of lactic acid and 2-propyl-2-nitro-1,3-propanediol is heated in the presence of a small amount of mineral acid catalyst, at a temperature of approximately 80° C. for a period of two hours under reduced pressure. The water which is formed during the esterification reaction may be satisfactorily removed by adding to the crude reaction mixture a suitable quantity of dry benzene and distilling the resulting mixture, thus removing the water together with the benzene in the form of a constant boiling mixture. The still residue resulting may then be dissolved in dry benzene and any colored impurities present therein removed by treatment with activated carbon. The resulting mixture is then filtered, and the benzene evaporated therefrom to obtain a substantially colorless esterification product.

My inevntion may be more specifically illustrated by the following example:

Example

The esterification product formed by the action of lactic acid on 2-propyl-2-nitro-1,3-propanediol, was prepared by heating at 80° C. for a period of two hours and under 80 mm. vacuum, 54.5 parts of 2-propyl-2-nitro-1,3-propanediol with 107 parts of 85% lactic acid, in the presence of .3 part of concentrated sulfuric acid. When the reaction was complete, three hundred parts of dry benzene were added to the crude mixture and the resulting solution distilled in order to remove the water formed during the esterification reaction. The residue was again dissolved in benzene, and the colored impurities contained therein were substantially removed by treatment with a small portion of activated charcoal. This mixture was then filtered and the benzene was distilled therefrom under reduced pressure. There was obtained, as a still residue, 87 parts of a viscous, pale yellow syrup soluble in alcohol and in water to the extent of .765 g. per 100 cc. of water at 25° C.

The esterification product of my invention is useful as an organic solvent and may also be employed as a plasticizer for various film-forming compositions. Other uses for this material will be apparent to those skilled in the art.

My invention now having been described, what I claim is:

The esterification product of lactic acid and 2-propyl-2-nitro-1,3-propanediol.

BYRON M. VANDERBILT.